INVENTOR.
JULIUS LERNER
BY Donald R. Johnson
ATTORNEY

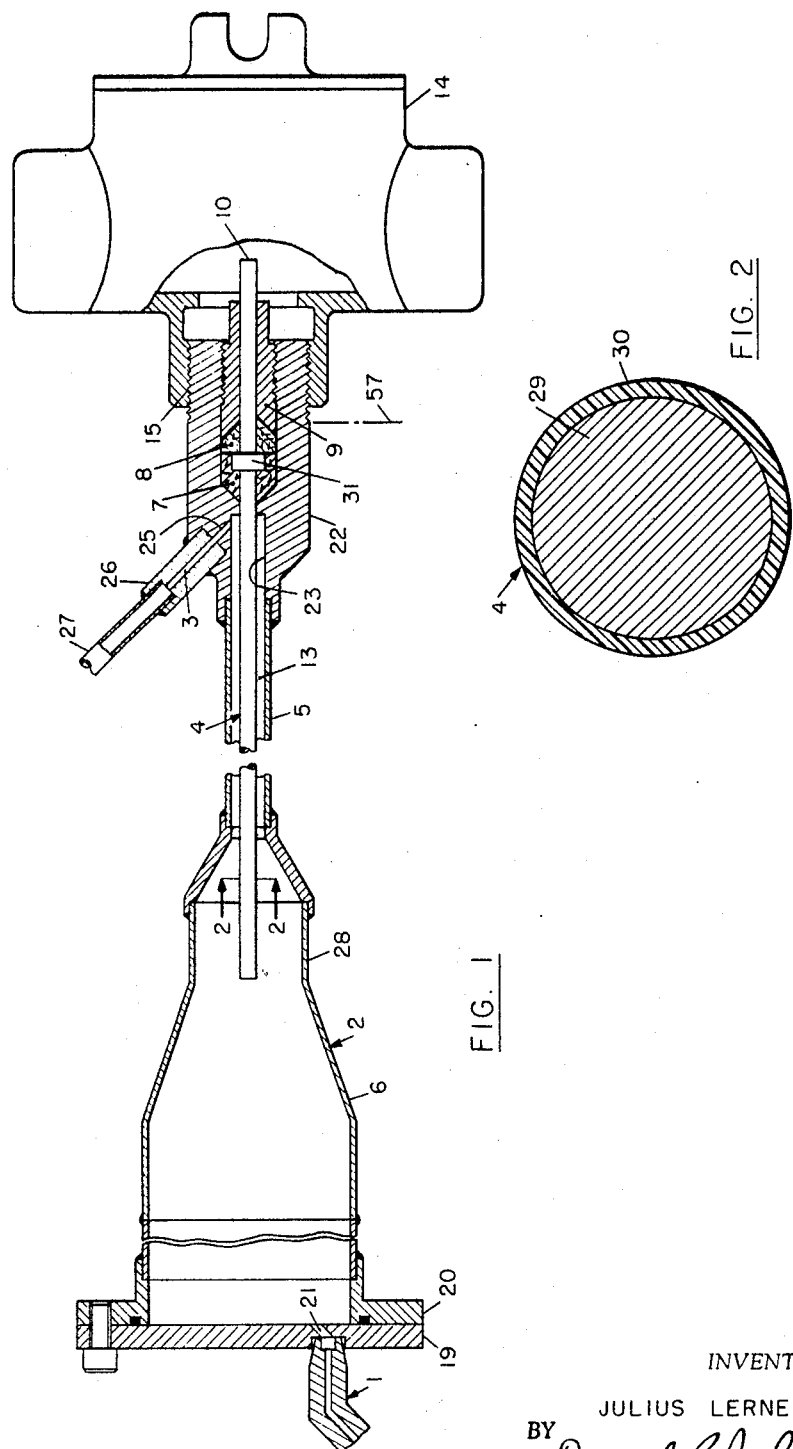

United States Patent Office 3,464,258
Patented Sept. 2, 1969

3,464,258
MEASURING APPARATUS FOR LIQUID
MIXTURES
Julius Lerner, Broomall, Pa., assignor to Sun Oil Company, Philadelphia, Pa., a corporation of New Jersey
Filed Apr. 19, 1967, Ser. No. 631,927
Int. Cl. G01n 11/00
U.S. Cl. 73—61.1    5 Claims

ABSTRACT OF THE DISCLOSURE

For measuring the proportion of one component liquid in a binary mixture of immiscible liquids of different densities, a sample of the mixture is allowed to stand in a vertically-elongated container of non-uniform cross section. The non-uniformity of the container provides a region of small volume at one end of the container, and a capacitive probe is mounted in this region. The electrical capacitance between this probe and the container is measured to provide an indication of the proportion of either the higher-density or the lower-density component, depending upon the relative orientation of the container at the time the measurement is made.

---

This invention relates to a measuring apparatus for liquid mixtures, and more particularly to an apparatus for measuring the proportion of one component liquid in a mixture of a plurality of immiscible liquids having different dielectric constants and different densities.

In the operation of a plant such as an oil refinery, it is often necessary or desirable to measure the proportion of one liquid component in a mixture of two liquids. In those cases where there is enough difference in density between the two liquids, one or the other of two methods may be used.

In one of these methods, a sample of the mixture is periodically drawn and allowed to stand in a glass graduate. The lighter liquid component will separate from the heavier liquid component and, due to the difference in densities, the lighter material will rise to the top and the heavier material will sink to the bottom. The percentage of each can then be noted.

The other of the two methods previously mentioned is disclosed in my abandoned application Ser. No. 165,091, over which the present invention may be considered to be an improvement. In this latter method, a sample of the liquid mixture to be analyzed is allowed to stand in a vertically-elongated container until separation of the different-density liquid components occurs. Then, the height of the interface between the two components (and, hence, the proportion of one component in the mixture) is measured by measuring the electrical capacitances between each of two insulated probes (which are mounted in different portions of the container) and the wall of the container, these capacitance measurements taking advantage of the fact that the dielectric constants of the components of the mixture are different from each other.

An object of this invention is to provide a measuring apparatus for liquid mixtures which constitutes an improvement over the related apparatus disclosed in my aforementioned application.

Another object is to provide a measuring apparatus for liquid mixtures which is simpler and less expensive than the apparatus disclosed in my aforementioned application.

A further object is to provide a measuring apparatus for liquid mixtures which is more sensitive than, or in the alternative, is of smaller size than, the apparatus disclosed in my aforesaid application.

The objects of this invention are accomplished, briefly, in the following manner: A vertically-elongated container is provided with inlet and outlet connections, by means of which a sample of the liquid mixture to be analyzed may be introduced into the container. The cross-sectional area at one end of the container is small compared to that at the other end, so that a small-volume region is provided at said one end. A capacitive probe is mounted to extend into the small-volume region only of the container. The probe is connected to an electrical capacitance measuring circuit, for measurement of the capacitance between this insulated probe and the (grounded) container. The container may be disposed in either one or the other of two orientations, to wit, one wherein the small-volume region is located at the upper end of the container, and the other wherein this region is located at the lower end of the container.

A detailed description of the invention follows, taken in conjunction with the accompanying drawings, wherein:

FIG. 1 is a vertical (longitudinal) section through a sensing unit or cell according to the present invention;

FIG. 2 is a transverse section (taken on line 2—2 of FIG. 1) through the capacitive probe used in the cell, drawn on an enlarged scale;

Figure 3:
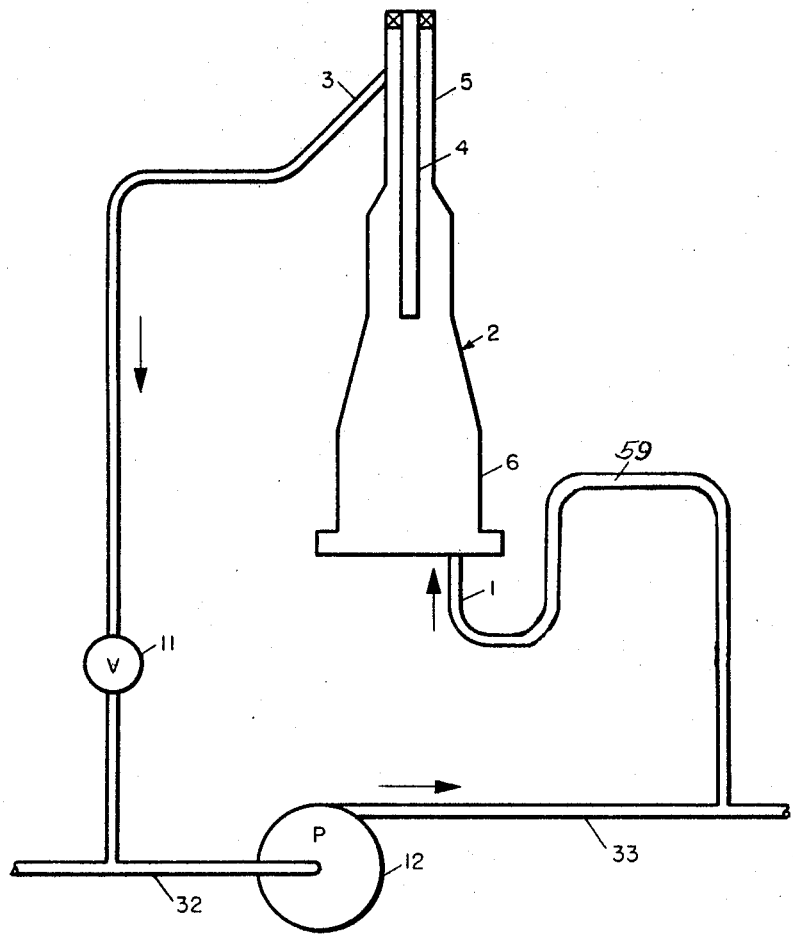
FIG. 3 is a schematic diagram illustrating the connection of the sensing unit of the invention into a liquid flow system.

The apparatus of the present invention is capable of being used to measure the proportion of one component liquid in a mixture of a plurality of immiscible liquids having different densities and different dielectric constants. Such one liquid can be either the lighter or heavier component in a binary mixture, or it can be the lightest or heaviest in a mixture of more than two components.

For purposes of illustration, the apparatus of the present invention will be first described in connection with liquid measurement under the ensuing conditions. (1) The liquid mixture is binary. (2) The lighter or less dense material is present in the smaller quantity. (3) The higher density material has a higher dielectric constant than does the lower density material, and this higher dielectric constant is very large in comparison with that of the lighter material. If this large ratio of dielectric constants does not exist, the apparatus would require that the dielectric constants of the two materials remain fixed.

By way of example, the measurement of a small proportion of oil in a liquid mixture of oil and water fits the three conditions set out in the preceding paragraph. FIG. 1 is a vertical section of a cell designed to measure the amount of oil in a mixture of oil and water, the cell being illustrated as laid on its side in this figure, so that the lower or bottom end of the cell is at the left and the top or upper end is at the right. Referring now to FIG. 1, a metallic flange 19 (which matches an annular flange 20 provided at the lower end of the cell) is fastened (and sealed) to the lower end of a cell, which latter is denoted in general by numeral 2. In FIG. 1, the cell is oriented so that flanges 20 and 19 are at the bottom of the entire unit. In addition to its function of sealing the lower end of cell 2, flange 19 has sealed thereinto an inlet connection 1 (illustrated as a pipe), by way of which a sample of the liquid mixture to be analyzed may flow into the lower end of the hollow, chamber-like interior of cell 2. A passageway 21 through flange 19 is aligned with the bore of pipe 1 to complete the sample inlet connection for the cell.

The cell or container 2 is of non-uniform cross-sectional area, the cell portion 6 of larger cross-sectional area being located at the lower end of the cell in FIG. 1. This will be further referred to hereinafter. The cell 2 has metallic outer walls, and this cell is preferably fabricated by welding together, in end-to-end relationship, a plurality of tubular metal pieces, as illustrated in FIG. 1. Cell or container 2 is cylindrical in outer configuration and has a central longitudinal axis of symmetry, but has portions of various different diameters along its length, to provide the non-uniform cross-sectional configuration previously set forth.

In FIG. 1, the cell portion of smaller cross-sectional area is located at the upper end thereof, and comprises a piece of metal tubing 5 of uniform diameter. A cylindrical sealing and mounting body 22, whose outer diameter is larger than that of tube 5, is welded to the upper end of this tube. In the lower end of body 22, there is a central longitudinal bore 23 which has the same diameter as the bore of tube 5 and is aligned therewith. An outlet connection 3 is provided at the upper end of cell 2, by way of which the liquid mixture which flows into the lower end of the cell (at 1) may leave the cell chamber. The inner end of a downwardly-inclined passageway 25 in body 22 communicates with the upper end of bore 23, and the inner end of a centrally-bored fitting 26 is sealed into body 22 to communicate with the outer end of passageway 25. One end of an outlet tube 27 is sealed into the outer end of fitting 26 to form a continuation of outlet connection 3; the axis of the bore in tube 27, the axis of the bore in fitting 26, and the axis of passageway 25 are all collinear, so that in sum the outlet connection 3 extends downwardly from the upper end of bore 23, as an acute angle to the longitudinal axis of this latter bore and of the cell 2.

A cylindrical capacitive probe 4 (which is shown in cross-section in FIG. 2) is mounted axially in the upper or small-diameter end 5 of cell 2. The upper portion of probe 5 extends through the entire length of body 22, and this probe extends throughout the entire length of tube 5, the lower end of the probe being approximately coplanar with the lower end of an intermediate-diameter cell portion 28 located at the upper end of the cell portion 6 and just below the lower end of tube 5.

As illustrated in FIG. 2, the probe 4 comprises a cylindrical metallic rod 29 surrounded by a thin-walled tube 30 of electrical insulating material, which tube may be made from the polymeric tetrafluoroethylene resin known as "Teflon." The electrical insulating material completely surrounds the rod 29 (including the lower end face thereof), except at the upper end 10 thereof, so that the metallic portion of the probe is electrically insulated from the metallic wall of cell 2, which latter includes the metal tube 5.

A packing gland arrangement, which includes packing elements 7 and 8 operating on an enlarged-diameter portion 31 of probe 4 and compressed by a gland nut 9 which threads into the upper end of body 22, acts as a hydraulic seal for the upper end of probe 4, above bore 23.

An electrical connection is made to the upper end 10 of the insulated capacitive probe or electrode 4, and the metal tube 5 (surrounding probe 4) acts as the grounded plate of the capacitor thus formed.

Refer now to FIG. 3, which illustrates the sensing unit of the invention connected into a liquid flow system in a plant, such as an oil refinery. A valve 11 is inserted between the outlet connection 3 of the cell 2 and the return to the plant flow line 32. A pressure drop is required to cause flow through the cell 2. FIG. 3 shows a pump 12, with the cell sample being taken from the discharge side 33 (inlet connection 1 being connected to pipe 33) and the cell sample being returned to the suction 32 of the pump 12 (outlet connection 3 being connected to pipe 32), but an existing pressure drop, between vessels for example, could be used instead.

Assume that the liquid mixture to be analyzed is flowing through the plant pipe 32, the plant pump 12, and the plant pipe 33. To operate the measuring apparatus of this invention, the valve 11 is opened and a sample is permitted to flow through the cell 2 by way of its connections 1 and 3. This flow continues long enough to sweep out all of the old sample and fill the cell with new or fresh sample. Then, the valve 11 is closed and a sample is trapped in the cell and allowed to stand therein. Due to the difference in densities of the two liquid components, the lighter material, for example oil, will rise to the upper end of the cell and the heavier material, for example water, will sink to the bottom thereof. At this juncture, it should be pointed out that this separation is effected solely by gravity; any portion of the lighter component which stays in suspension, or which forms an emulsion with the heavier component, will not be measured.

The sensing unit or cell 2 is so dimensioned that the volume of the annular space 13 (FIG. 1) between probe 4 and the inner wall of tube 5 is small compared to the total volume of the container or cell. More specifically, the ratio between the volume of this annular space (i.e., the small-volume region at the upper end of the container) and the voulme of the entire container is equivalent to the maximum expected porportion (in the liquid mixture) of the lighter component (e.g., oil) being measured in the FIG. 1 configuration. By way of example, the annular space 13 may be five inches long and may comprise 1% of the total cell volume. As a result of the aforementioned relationships, the proportion of the lighter component that has separated out may be determined by measuring the change in capacitance that has taken place. The ensuing example will serve to illustrate this.

First, let us assume there is no lighter material present. In this case, when the flow of liquid through the cell is stopped there will be no separation of components, and the entire annular space 13 will be filled with the heavier and higher dielectric constant material, and an electrical capacitance (between probe 4 and ground, or the metal wall of the cell) will be measured. Next, let us assume that there is 0.20% of the lighter (and lower dielectric constant) material present in the mixture. After the flow through the container-cell is stopped and the gravity separation of the material has been allowed to take place, the upper one inch of the annular space 13 will be filled with the lower dielectric material and the lower four inches of this annular space will be filled with the higher dielectric material. This will result in a capacitance reading very close to 20% lower than before. In the range of zero to 1% of lower dielectric constant material, the reduction in capacitance reading will be very nearly exactly proportional to the percentage of lower dielectric constant material present in the mixture.

To complete the operation, after the separation has been finished and the capacitance reading made, the valve 11 (FIG. 3) is opened, causing the cell unit to be flushed, and then a fresh sample is trapped in the container by reclosing this valve. Valve 11 can be a hand-operated valve, or it can be a remote-operated one that can be programmed so as to automatically change samples on a predetermined time cycle.

Figure 4:
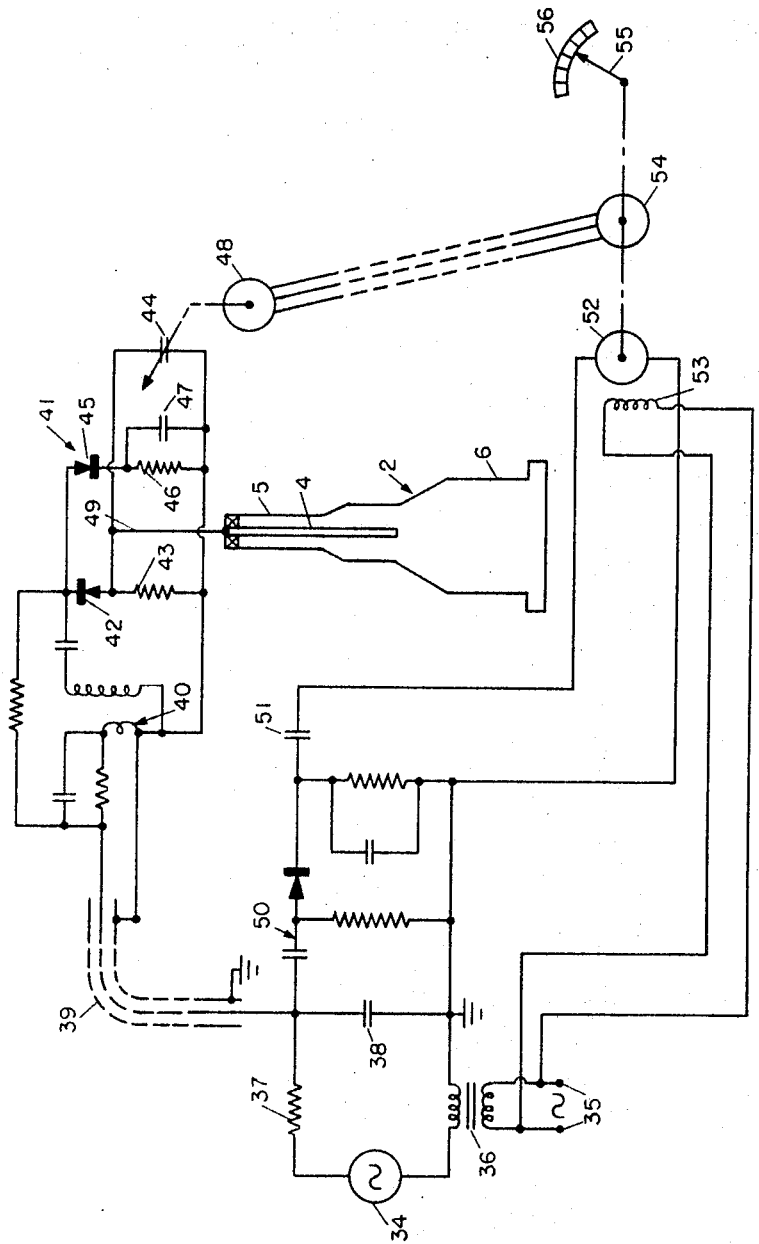
FIG. 4 is a wiring diagram illustrating a form of capacitance measuring circuitry which may be used with the sensing unit of the invention.

While various types of circuitry may be used for measurement of the capacitance provided between probe 4 and the metal wall of the container (ground), there is illustrated in FIG. 4 a relatively simple circuit arrangement which is of a type suitable for measurement of the capacitance changes which occur during measurement or analysis, with the present invention. The FIG. 4 circuit, and other suitable circuits having similar properties, are disclosed in Shawhan Patent No. 2,943,258, dated June 28, 1960. It may be noted that FIG. 4 herein corresponds to FIG. 12 of the aforesaid patent.

In FIG. 4, the pole 4 is represented in its relative position within the (electrically grounded) sample cell or container 2. An oscillator indicated at 34 provides a relatively high frequency output, the frequency being subject to a very wide range of choice but being desirably in excess of the commercial alternating frequency (e.g., 60 c.p.s.)

which is provided at terminals 35 to the primary of a transformer 36 whose secondary is in series with the output connections of the oscillator 34. The inputs thus provided are fed to a voltage divider arrangement comprising a resistor 37 and a fixed capacitor 38. The junction of these last two elements is connected to the central conductor of a coaxial cable 39 the sheath of which is grounded. Through the impedance matching and tuned circuit arrangement indicated at 40, the characteristics of which are described in detail in the aforementioned patent, the signals are fed to a detecting assembly 41 which is desirably local to the capacitance which is to be measured (i.e., the capacitance presented between probe 4 and the container 2). A diode 42 is connected between the input and ground, in series with the parallel arrangement of a resistor 43, the probe 4 (which presents a capacitance between itself and the grounded container 2), and a variable capacitor 44. An oppositely-disposed diode 45 is connected between the input and ground, in series with the parallel arrangement of a resistor 46 and a fixed capacitor 47, which latter capacitor desirably has a value close to the total capacitance of probe 4 and capacitor 44. Resistors 43 and 46 are desirably equal. A selsyn receiver 48 is arranged to vary the capacitance of capacitor 44.

Referring back to FIG. 1, a suitable receptacle 14 known as a "Condulet" may be secured directly to the upper end of body 22 by means of the male straight pipe threads 15 illustrated at the top of this body. The assembly 41 of FIG. 4 may be positioned in this "Condulet," and the lead 49 of FIG. 4 (which is connected to probe 4 in this figure) may extend within the "Condulet" to the upper end 10 of probe 4 (FIG. 1); it may be noted in FIG. 1 that the upper end of probe 4 is positioned within the receptacle 14. Thus, assembly 41 is local to the capacitance 4, 5 to be measured. Lead 49 is not shown in FIG. 1.

Referring again to FIG. 4, a demodulating circuit 50 provides through capacitor 51 current to one winding of a reversible motor 52, a reference winding 53 of which is energized from the terminals 35. The arrangement is such that the direction of rotation of the motor is dependent upon the phase relationships of the currents fed to its two windings. The motor 52 drives the selsyn transmitter 54 which is connected to drive the receiver 48. It also drives a pointer 55 movable with respect to a scale 56, which may be graduated directly in terms of the percentage of the one component liquid (e.g., oil) which is to be measured or determined.

As will be evident, the meter indicating arrangement described may be replaced by an automatic recorder, to record the variations of the proportion of oil in the samples with respect to time. If this is done, a permanent and continuous record may be made.

Since the circuit of FIG. 4 itself forms no part of the present invention, its operation and advantages need be only briefly described.

The input provided by the transformer 36 effects a switching action which causes, during one half-cycle, one of the diodes to conduct and the other to be cut off, while during the next half-cycle the reverse occurs. Consequently, the high frequency signal (i.e., the signal output of oscillator 34) is affected, during successive half-cycles, alternately by the fixed capacitor 47 or the parallel arrangement of probe 4 and capacitor 44. The result is a modulated high frequency wave which through detector 50 gives rise to a phase shifted output serving to drive the motor 52 in one direction or the other, in dependence upon the relative capacitance values presented by the capacitor 47, on the one hand, or the parallel arrangement of capacitive probe 4 (which presents a capacitance between itself and container 2) and capacitor 44, on the other. Connections are so made that the motor 52 effects, through the selsyn arrangement, adjustment of the capacitor 44 to make equal, or to bring into a definite relationship, these capacitances. As will be evident, the circuitry functions to differentially compare the capacitances of the probe 4 and of the fixed capacitor 47; the resulting adjustment of the capacitor 44 is then a measure of the value of the capacitance of probe 4. As will be understood from the above description, the scale 56 may be calibrated in terms of the percentage of the one component liquid (for example, the lighter liquid) which is to be measured.

The circuitry described is particularly advantageous for the measurement of small capacitance changes, such as occur in the present type of apparatus. Due to the comparison arrangement afforded by the switching action in the portion 41 of the circuit, the measurements are quite independent of the unavoidable changes occurring elsewhere in the circuit, and particularly in the transmission line 39. The recording or metering apparatus may, accordingly, be remote from the cell or container 2.

The percentage of lighter material which it is possible to measure can be changed by changing the dimensions of the cell 2. For example, the volume of the annular space 13 could be 5% or 10% of the total volume of the cell, if it were desired to measure up to a maximum proportion of 5% or 10%, respectively, of the lighter liquid component.

As previously mentioned, the outlet connection 3 at the upper end of the cell slopes downwardly from the upper end of bore 23. This prevents the separated lighter material from moving down the outlet tube; if this happened, it would result in inaccurate readings of the proportion of lighter component in the mixture. The outlet connection 3 thus acts as a trap for the lighter material.

As illustrated at 59 in FIG. 3, the inlet pipe 1 has a portion which extends upwardly, above the upper end of passageway 21, thereby to provide a trap for the heavier material. This trap prevents the separated heavier material from moving through inlet pipe 1 (when valve 11 is closed); if this happened, it would also result in inaccurate readings of the proportion of lighter component in the mixture.

By inverting the unit illustrated in FIG. 1, it can be used to measure small amounts of the denser or heavier liquid in a mixture made up mostly of lighter or less dense liquid. This will be better understood from a consideration of FIG. 5, described hereinafter.

In some cases, it may be necessary or desirable to immerse the cell in a liquid bath; this could be done for the purpose of maintaining the sample at a substantially constant temperature (as in my aforementioned abandoned application), or for the purpose of providing heat to the sample, to improve the separation of the two liquids. With the configuration illustrated in FIG. 1 (used, as previously mentioned, to measure the proportion of the less dense material, when this material is the one present in small quantities in the mixture), there would be no problem; the unit would simply be suspended in the liquid bath whose surface might be at the level indicated by the dot-dash line 57.

Figure 5:
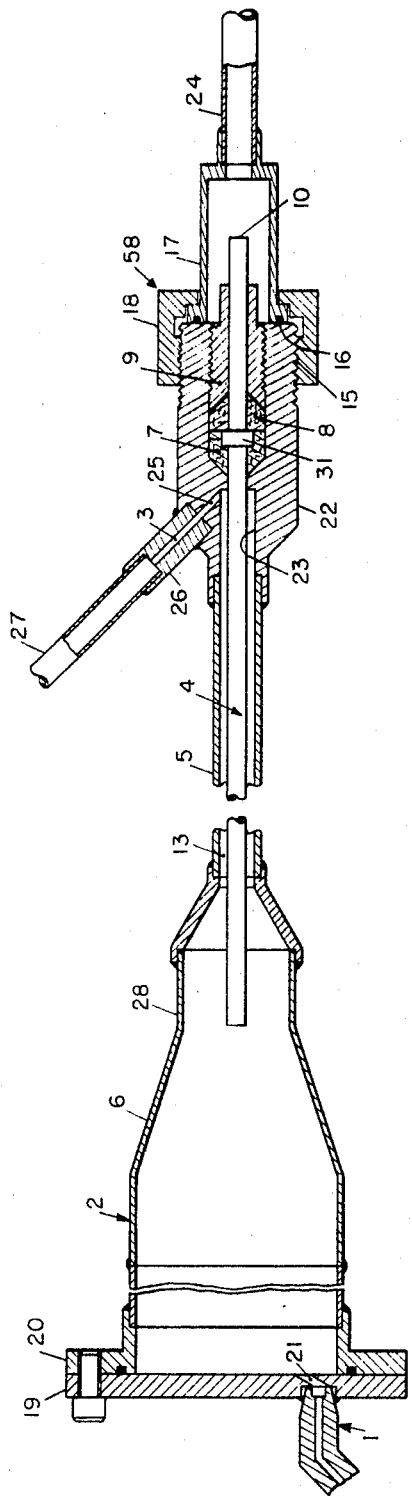
FIG. 5 is a vertical section through a detecting unit or cell of somewhat modified construction.

However, this could not be done in those cases where the more dense material is the one to be measured and is the one present in small quantities in the mixture. If the cell unit illustrated in FIG. 1 were inverted and suspended in a bath, the electrical connection at the top 10 of the probe would be wetted and if this bath liquid were conducting, it would short-circuit the unit. To avoid this, the unit is modified as illustrated in FIG. 5. In FIG. 5, elements the same as those of FIG. 1 are denoted by the same reference numerals. In FIG. 5, the unit or cell is again illustrated as laid on its side, but in this figure, the upper or top end of the cell is at the left and the lower or bottom end of the cell is at the right.

In FIG. 5, in place of the "Condulet" 14 being screwed on the straight pipe thread as in FIG. 1, a pressure-tight gland (denoted generally by numeral 58) is used. Gland 58 includes a compressible element 16, for example an O-ring, which is mounted in an annular groove provided in the upper face of a shouldered seal cap 17 mounted on the lower face of body 22. A gland nut 18 threads onto the pipe threads 15 and has an internal annular flange which engages under the shoulder of seal cap 17. Sealed into the lower end of the centrally-bored seal cap 17, such as by welding, is a piece 24 of metal tubing, which acts as a pressure-tight conduit for containing the lead wire (not shown in FIG. 5, but shown at 49 in FIG. 4) from the bare lower end 10 of probe 4.

The operation of the FIG. 5 arrangement is much the same as that of FIG. 1, previously described, except that in FIG. 5 the heavier component of the sample separates out at the bottom of the cell, where the probe 4 is located. The measurement of the capacitance of probe 4 then represents the proportion of the more dense material which is present in the mixture, this more dense material being the one present in small quantities. Of course, during flushing of the FIG. 5 cell, the liquid flows therethrough from top to bottom, rather than from bottom to top, as in FIG. 1. In FIG. 5, the outlet connection 3, sloping upwardly from the lower end of bore 23, serves as a trap for the heavier material and prevents the separated heavier material from rising up the outlet tube.

In the FIG. 5 configuration, the trap 59 in inlet pipe 1 (compare FIG. 3) extends downwardly, below the lower end of passageway 21, thereby preventing the separated lighter material from moving through this inlet pipe.

The cell unit of this invention provides several advantages, which will now be set forth. (1) It furnishes a substantially continuous reading, which can be recorded. (2) It provides a remote readout (see cable 39, FIG. 4). (3) It is simpler than the double-probe unit disclosed in my aforementioned abandoned application. (4) It is less expensive than the double-probe unit. (5) Where ultrasonic energy is required to promote the separation, the small size of the unit of this invention reduces the energy requirement. (6) The single-probe unit of this invention can be designed for smaller resolutions than the double-probe unit.

The invention claimed is:

1. A method of detecting component changes in a mixture of a plurality of immiscible liquid components having different dielectric constants and different densities, which comprises feeding a sample of said mixture into a capacitor cell, allowing said mixture to stand in said cell, thereby to cause it to separate into its liquid components and to establish a substantially horizontal planar interface between such components, the electrodes of said cell being so disposed that said interface is located intermediate the ends of such electrodes; and measuring the capacitance between said electrodes.

2. Method according to claim 1, including the additional step of removing the separated components from said cell and feeding a fresh sample of the mixture thereinto, subsequent to the measuring of the capacitance.

3. Apparatus for measuring the proportion of one liquid component in a mixture of a plurality of immiscible liquids having different dielectric constants and different densities, comprising a vertically-elongated conductive container, the cross-sectional area at one end of said container being small compared to the cross-sectional area at the other end thereof, thereby to provide a small-volume region at said one end of said container, the ratio between the volume of said region and the volume of the entire container being equivalent to the maximum expected proportion of said one component; a capacitive probe electrically insulated from said container and mounted to extend into said region only of said container, said container being filled with the liquid mixture to be analyzed, said mixture upon standing in said container separating into its liquid components, thereby to establish a substantially horizontal planar interface between such components, said interface being located intermediate the ends of said probe, whereby the portion of the probe within the container and above the interface level is surrounded by one of said liquid components and the portion of the probe within the container and below the interface level is surrounded by another of said liquid components; and means for connecting said probe to an electrical measuring circuit, whereby the total capacitance between said probe and said container may be measured.

4. Apparatus as set forth in claim 3, wherein said mixture is binary, said one liquid component is the lower-density liquid, and said one end of said container is the upper end thereof.

5. Apparatus as set forth in claim 3, wherein said mixture is binary, said one liquid component is the higher-density liquid, and said one end of said container is the lower end thereof.

References Cited
UNITED STATES PATENTS

| | | |
|---|---|---|
| 2,599,583 | 6/1952 | Robinson et al. |
| 2,720,624 | 10/1955 | Gunst et al. |
| 3,133,437 | 5/1964 | Remke et al. _____ 73—61.1 |

LOUIS R. PRINCE, Primary Examiner

JOSEPH W. ROSKOS, Assistant Examiner